US010591582B1

(12) United States Patent
Musgrove et al.

(10) Patent No.: US 10,591,582 B1
(45) Date of Patent: Mar. 17, 2020

(54) CO-NOTCH AND INDEPENDENT WINDOWING TO MITIGATE INTERFERENCE IN SAR-BASED IMAGERY

(71) Applicants: National Technology & Engineering Solutions of Sandia, LLC, Albuquerque, NM (US); James C. West, Stillwater, OK (US)

(72) Inventors: Cameron Musgrove, Albuquerque, NM (US); Robert Riley, Albuquerque, NM (US); James C. West, Stillwater, OK (US)

(73) Assignees: National Technology & Engineering Solutions of Sandia, LLC, Albuquerque, NM (US); James C. West, Stillwater, OK (US)

( * ) Notice: Subject to any disclaimer, the term of this patent is extended or adjusted under 35 U.S.C. 154(b) by 487 days.

(21) Appl. No.: 15/354,033

(22) Filed: Nov. 17, 2016

Related U.S. Application Data (60) Provisional application No. 62/257,620, filed on Nov. 19, 2015.

(51) Int. Cl.
  *G01S 7/02* (2006.01)
  *G01S 13/90* (2006.01)
(52) U.S. Cl.
  CPC .......... *G01S 7/023* (2013.01); *G01S 13/9023* (2013.01)
(58) Field of Classification Search
  CPC .......... G01S 7/023; G01S 7/02; G01S 7/2806; G01S 7/2923; G01S 13/89; G01S 13/90;
  (Continued)

(56) References Cited

U.S. PATENT DOCUMENTS

| 4,924,229 A | 5/1990 | Eichel et al. |
| 4,999,635 A | 3/1991 | Niho |

(Continued)

FOREIGN PATENT DOCUMENTS

| WO | WO-2012038705 A1 * | 3/2012 | ............... G01S 7/04 |
| WO | WO-2016005738 A1 * | 1/2016 | ......... G01S 13/9023 |

OTHER PUBLICATIONS

Pinhiero et al., Reconstruction of Coherent Pairs of Synthetic Aperture Radar Data Acquired in Interrupted Mode, Apr. 2015, IEEE Transactions on Geoscience and Remote Sensing, vol. 53, No. 4, pp. 1876-1893 (Year: 2015).*

(Continued)

*Primary Examiner* — Timothy A Brainard
(74) *Attorney, Agent, or Firm* — Medley, Behrens & Lewis, LLC (57) ABSTRACT

Various technologies for mitigating distortion in coherent image products generated from SAR data are described herein. Synthetic aperture radar (SAR) datasets generated based upon SAR returns from first and second passes of a SAR platform over a scene are received. The SAR datasets can be co-notched at matching sample indices to improve coherence of SAR images generated from the datasets. Windowed SAR data is generated by applying independent windows to subsets of each of the datasets to reduce sidelobe levels of their image impulse responses. Coherent image products are generated based upon the windowed SAR data, wherein an image quality of the coherent image products is improved as compared to coherent image products generated based upon the SAR datasets.

19 Claims, 7 Drawing Sheets

(58) Field of Classification Search
CPC ............. G01S 13/9017; G01S 13/9023; G01S 13/9035; G01S 13/9058; G01S 13/9094; G01S 13/9004; G01S 13/9011; G01S 13/9021; G01S 13/9027; G01S 13/9029; G01S 13/904; G01S 13/9056; G06T 7/33; G06T 7/38
See application file for complete search history.

(56) References Cited

U.S. PATENT DOCUMENTS

| | | | |
|---|---|---|---|
| 5,680,138 A * | 10/1997 | Pritt | G01S 7/4052 |
| | | | 342/169 |
| 5,969,662 A * | 10/1999 | Hellsten | G01S 7/003 |
| | | | 342/25 A |
| 6,028,549 A | 2/2000 | Buckreuss et al. | |
| 6,078,701 A * | 6/2000 | Hsu | G06K 9/32 |
| | | | 375/E7.086 |
| 6,166,678 A | 12/2000 | Jao | |
| 7,551,118 B2 | 6/2009 | Hellsten | |
| 7,551,119 B1 * | 6/2009 | Doerry | G01S 13/9035 |
| | | | 342/159 |
| 7,812,758 B2 | 10/2010 | Morris | |
| 8,259,003 B2 | 9/2012 | Song | |
| 8,400,349 B1 | 3/2013 | Dubbert et al. | |
| 8,692,704 B1 * | 4/2014 | Perkins | G01S 13/90 |
| | | | 342/191 |
| 8,824,544 B2 | 9/2014 | Nguyen et al. | |
| 9,110,167 B2 | 8/2015 | Cho et al. | |
| 2008/0050021 A1 * | 2/2008 | Plant | H04N 5/262 |
| | | | 382/209 |
| 2009/0091492 A1 | 4/2009 | Sanyal et al. | |
| 2013/0151201 A1 * | 6/2013 | McCorkle | G06F 17/141 |
| | | | 702/189 |
| 2014/0347213 A1 * | 11/2014 | Nguyen | H04B 15/00 |
| | | | 342/25 F |
| 2017/0061217 A1 * | 3/2017 | Cha | G06K 9/6277 |

OTHER PUBLICATIONS

Pinheiro, et al., "Reconstruction of Coherent Pairs of Synthetic Aperture Radar Data Acquired in Interrupted Mode", in IEEE Transactions on Geoscience and Remote Sensing, vol. 53, No. 4, Apr. 2015, pp. 1876-1893.

Doerry, et al., "Windowing Functions for SAR Data With Spectral Gaps", In Proceedings of SPIE, vol. 5095, 2003, pp. 54-65.

* cited by examiner

CO-NOTCH AND INDEPENDENT WINDOWING TO MITIGATE INTERFERENCE IN SAR-BASED IMAGERY

RELATED APPLICATION

This application claims priority to U.S. Provisional Patent Application No. 62/257,620, filed on Nov. 19, 2015, and entitled "CO-NOTCH TO MAXIMIZE COHERENCE FOR SAR", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Synthetic aperture radar (SAR) is used to create images of landscapes and other scenes. Aircraft equipped with SAR can fly over an area of interest and collect SAR data that can be used to image the area. Various sources of interference, such as radio frequency transmitters, weather radar stations, television transmission antennae, etc., may be present in the area of interest. Electromagnetic (EM) emissions from these sources of interference are often received simultaneously with a desired radar echo return by SAR antennae. Thus, SAR data collected by a SAR antenna frequently includes both the desired radar echo return and additional interference. When images are generated from the SAR data, the interference creates image artifacts. Conventional techniques for removing interference from SAR data, such as notch-filtering, can cause further degradation in quality of images generated from the SAR data, including coherent image products such as coherent change detection (CCD) images and interferometric SAR (IFSAR) images.

SUMMARY

The following is a brief summary of subject matter that is described in greater detail herein. This summary is not intended to be limiting as to the scope of the claims.

Various technologies for mitigating distortion in coherent image products generated from SAR data are described herein. First and second SAR datasets are received that correspond to first and second SAR scans of a scene at respective first and second times. Either or both of the first and second SAR datasets can include zero-valued data as a result of notch-filtering for interference mitigation, interruptions in SAR scanning pulses used in connection with interrupted SAR data collection, SAR antenna collection errors, etc. To improve coherence for generating coherent image products based upon the first and second SAR datasets, the datasets can be co-notched by notch-filtering each of the datasets at sample indices where the other dataset has zero-valued data. Windowed SAR data can be generated from the first and second SAR datasets by applying independent window functions to subsets of the datasets. The window functions are applied to the subsets to reduce sidelobe levels of image impulse responses (IPRs) of images generated from the windowed SAR data as compared to sidelobe levels of IPRs of images generated from the first and second SAR datasets. Unlike conventional window functions to reduce sidelobe levels, the window functions applied to the SAR datasets are configured to reduce the sidelobe levels of IPRs while allowing a mainlobe of the IPR to distort. Although mainlobe distortion can affect the quality of SAR imagery, the quality of a coherent image product generated from two SAR images is not substantially affected by distortion of the mainlobe of the two SAR images' IPRs. Thus, by reducing sidelobe levels of the IPRs without limiting mainlobe distortion, quality of coherent image products generated from the windowed SAR data is improved as compared with quality of coherent image products generated from the first and second SAR datasets.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to mitigation of distortion of SAR-based coherent image products are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Figure 1:
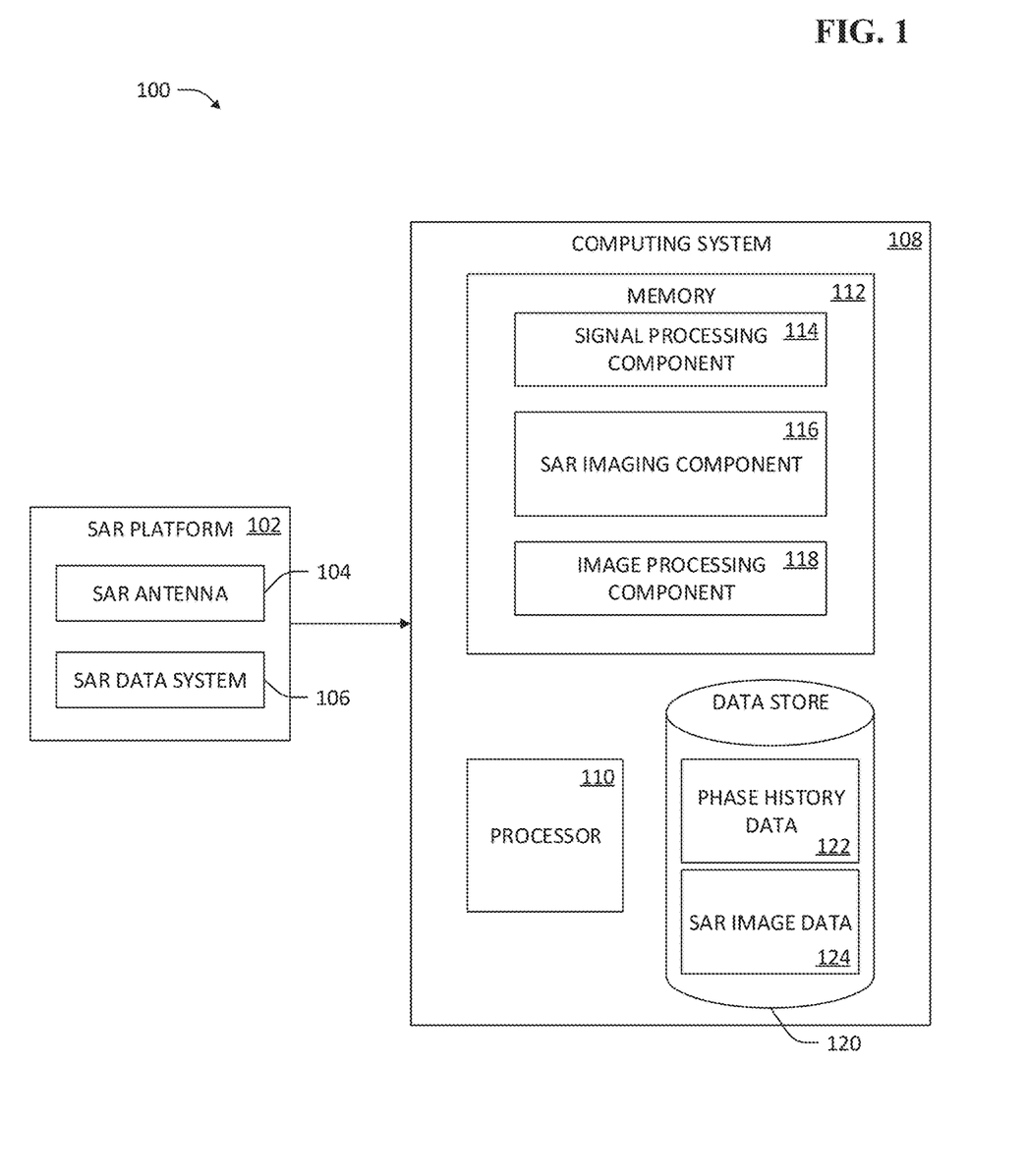
FIG. 1 is a functional block diagram of an exemplary system that facilitates mitigation of image artifacts and distortion in coherent image products.

With reference to FIG. 1, an exemplary system 100 that facilitates mitigating SAR image artifacts caused by interference and improving quality of coherent image products generated based upon SAR data is illustrated. The system 100 includes a SAR platform 102 on which is mounted a SAR antenna 104 that is coupled to a SAR data system 106. In exemplary embodiments, the SAR platform 102 can be an aircraft, a spacecraft, or other such platform. The SAR platform 102 can traverse an area of interest in connection with imaging the area via SAR imaging techniques. The SAR antenna 104 emits scanning pulses of electromagnetic radiation at ground cover and other objects in the area of interest, and receives echo returns of the scanning pulses that are reflected by the ground cover and the objects in the area. The SAR data system 106 receives signals from the SAR antenna 104 and performs various signal processing operations in order to generate SAR phase histories that can be used to generate SAR-based images of the area.

The SAR antenna 104 can also receive EM interference signals generated by various sources of EM emission in the area of interest. These sources of interference can be radio or television antennae, ground-based radar stations, etc. The EM interference signals received by the SAR antenna 104 interfere with and distort the echo returns, which in turn can cause artifacts in SAR images generated based upon those returns. SAR systems can be equipped to filter out these interference signals to mitigate image artifacts. Filtering out interference, however, can cause other artifacts and distortion in SAR images formed from returns received by the SAR antenna 104. Quality of coherent image products generated from these SAR images can likewise be degraded when interference is filtered in underlying SAR datasets.

The system 100 further comprises a computing system 108 that mitigates artifacts and distortions in coherent image products generated based upon multi-pass SAR data. The computing system 108 comprises at least one processor 110 and memory 112 comprising a signal processing component 114, a SAR imaging component 116, and an image processing component 118. The computing system 108 further comprises a data store that can be used in connection with storing phase history data 122 and SAR image data 124 for processing or presentment to a user. The signal processing component 114, the SAR imaging component 116, and the image processing component 118 together perform functionality that improves the quality of coherent image products generated based upon SAR data.

The signal processing component 114 receives a first SAR dataset and a second SAR dataset. The first SAR dataset corresponds to a first SAR scan of a scene. In other words, the first SAR dataset comprises data generated by the SAR data system 106 based upon a SAR echo return received by the SAR antenna 104 responsive to emission of scanning pulses by the SAR antenna 104 in a first pass of the SAR platform 102 over an area of interest comprising the scene. The second SAR dataset corresponds to a second SAR scan of the scene. The first and second SAR datasets can comprise SAR phase histories, spectral characteristic data, etc. In one example, the signal processing component 114 can receive the first and second SAR datasets after the datasets have been notch-filtered to remove signal components corresponding to an interference signal. In another example, the signal processing component 114 can notch-filter the first and second SAR datasets to remove signal components in each of the first and second SAR datasets that correspond to interference signals, in order to mitigate artifacts in image products generated from the first and second SAR datasets. In still another example, the first and second SAR datasets received by the signal processing component 114 can have zero-valued data at various sample indices based upon interrupted data collection from the SAR antenna (e.g., intentionally interrupted SAR).

In exemplary embodiments, the signal processing component 114 can be configured to co-notch the first and second SAR datasets. In connection with generating coherent image products based upon the first and second SAR datasets, matching notched sample indices between the first and second SAR datasets can improve clarity and quality of the coherent image products. The signal processing component 114 aligns the first and second SAR datasets in k-space (i.e., the spatial frequency domain) to correct for known motion variations of the SAR platform 102 between the first pass corresponding to the first SAR dataset and the second pass corresponding to the second SAR dataset. Prior to the SAR imaging component 116 generating coherent image products based upon the first and second SAR datasets, the signal processing component 114 can co-notch the first and second SAR datasets to match zero-value sample indices between the two datasets. The signal processing component 114 co-notches the first and second SAR datasets by notching each of the first and second SAR datasets at same sample indices. The signal processing component 114 can first identify sample indices corresponding to zero-valued data in the first SAR dataset. The signal processing component 114 can then notch-filter the second SAR dataset at the identified sample indices corresponding to the zero-valued data in the first SAR dataset. The signal processing component 114 can next identify sample indices corresponding to zero-valued data in the second SAR dataset. The signal processing component 114 can then notch-filter the first dataset at the identified sample indices that correspond to the zero-value data in the second SAR dataset.

The computing system 108 is configured to improve the quality of coherent image products generated based upon the first and second SAR datasets by applying independent window functions to subsets of the first and second SAR datasets. The signal processing component 114 of the computing system 108 applies the window functions independently to subsets of the first and second SAR datasets. The window functions are configured to reduce sidelobe levels of image impulse responses of images generated from the first and second SAR datasets while allowing mainlobes of the image impulse responses to distort. In an exemplary embodiment, the signal processing component 114 can apply a window function to each subset of contiguous non-zero samples in a notched SAR dataset.

Figure 2:
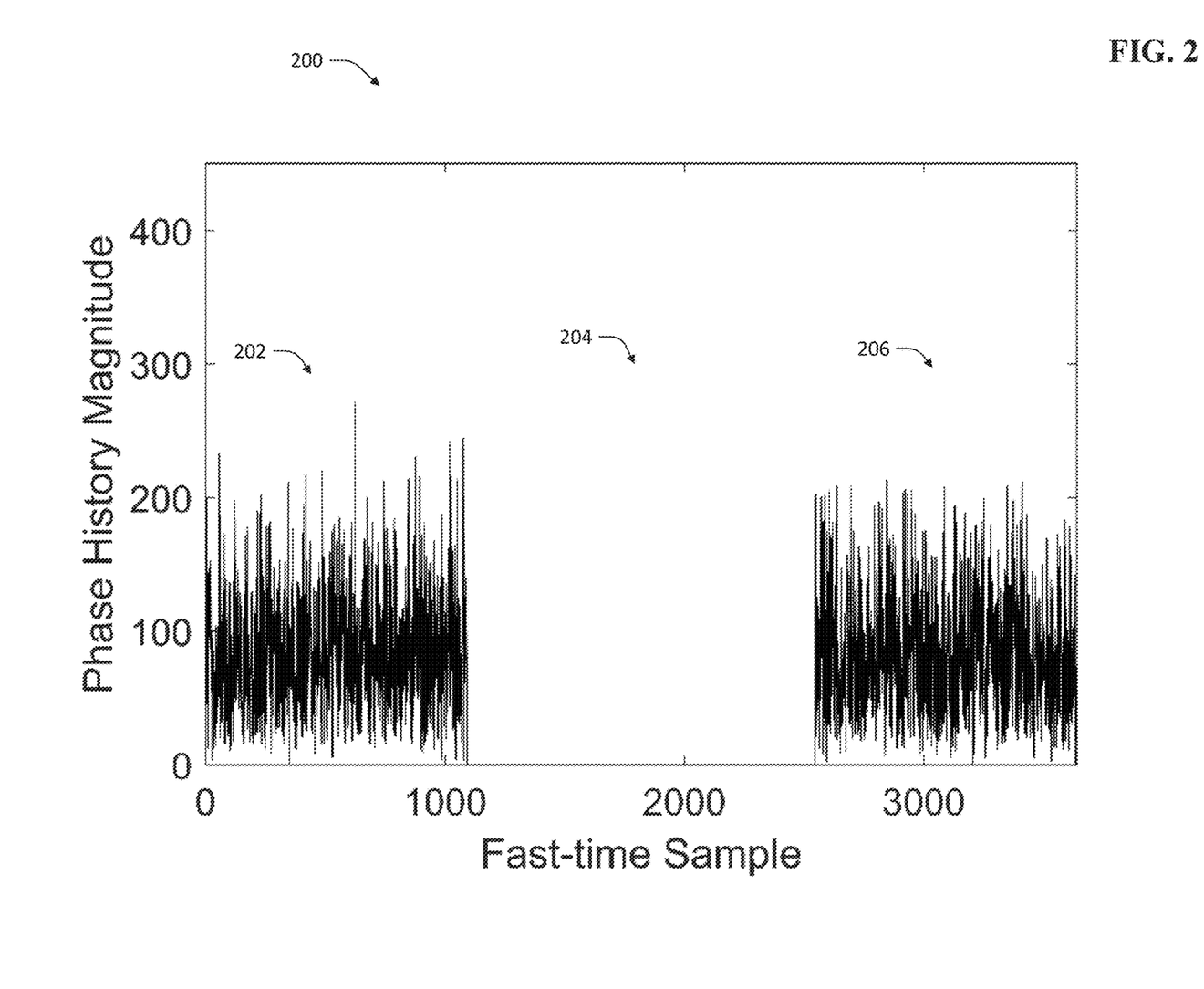
FIG. 2 is an exemplary plot of a SAR phase history dataset.

Referring now to FIG. 2, an exemplary plot 200 of a notched SAR phase history is illustrated. The plot 200 depicts a magnitude of a phase history for a chirped SAR return along the y-axis plotted with respect to fast-time sample indices along the x-axis. The fast time samples comprise a plurality of samples of a return of the SAR antenna 104 wherein the return comprises an echo of a single scanning pulse of the antenna 104. The plot 200 has a first set of contiguous non-zero samples 202 having fast-time sample indices of 0 to approximately 1,100, a second set of notched (i.e., set to zero) samples 204 having fast-time sample indices of approximately 1,100 to 2,600, and a third set of contiguous non-zero samples 206 having sample indices of approximately 2,600 to 3,700. In the exemplary notched phase history shown in the plot 200, the sets of samples 202 and 206 are non-adjacent and non-overlapping. In order to reduce sidelobe levels of an image impulse response of an image formed from the phase history illustrated in the plot 200, the signal processing component 114 can apply independent window functions (e.g., Taylor window functions) to the sets of samples 202 and 206, thereby generating windowed SAR data. For example, the signal processing component 114 can apply a first window function to the first set of samples 202, and a second window function to the third set of samples 206. In another example, the signal processing component 114 can apply the first window function to the first set of samples 202, and the signal processing component 114 can apply the same first window function to the third set of samples 206. The signal processing component 114 can match a size of a window function to a size of a subset of samples to which the window function is applied. For example, when the signal processing component 114 applies the first window function to the first set of samples 202, the first window function can be matched to a size of approximately 1,100 data samples in the phase history illustrated in the plot 200. Continuing the example, when the signal processing component 114 applies the second window function to the third set of samples 206, the second window function can be matched to a size of approximately 1,100 samples.

The SAR imaging component 116 can receive windowed SAR data from the signal processing component 114 and can form SAR images based upon the windowed SAR data. Continuing the example of the first and second SAR datasets described above, the SAR imaging component 116 can receive a first windowed SAR dataset generated by the signal processing component 114 based upon the first SAR dataset. The SAR imaging component 116 can receive a second windowed SAR dataset generated by the signal processing component 114 based upon the second SAR dataset. The SAR imaging component 116 forms first and second SAR images based upon the first windowed SAR dataset and the second windowed SAR dataset, respectively. In preparation for generating coherent image products based upon the first and second SAR images, the image processing component 118 can perform various processing steps to improve coherence between the first and second SAR images. For example, the image processing component 118 can register one of the images to another, autofocus the first and second SAR images, etc. The SAR imaging component 116 forms one or more coherent image products, such as a CCD image or an IFSAR image, based upon the first and second SAR images.

Figure 3:
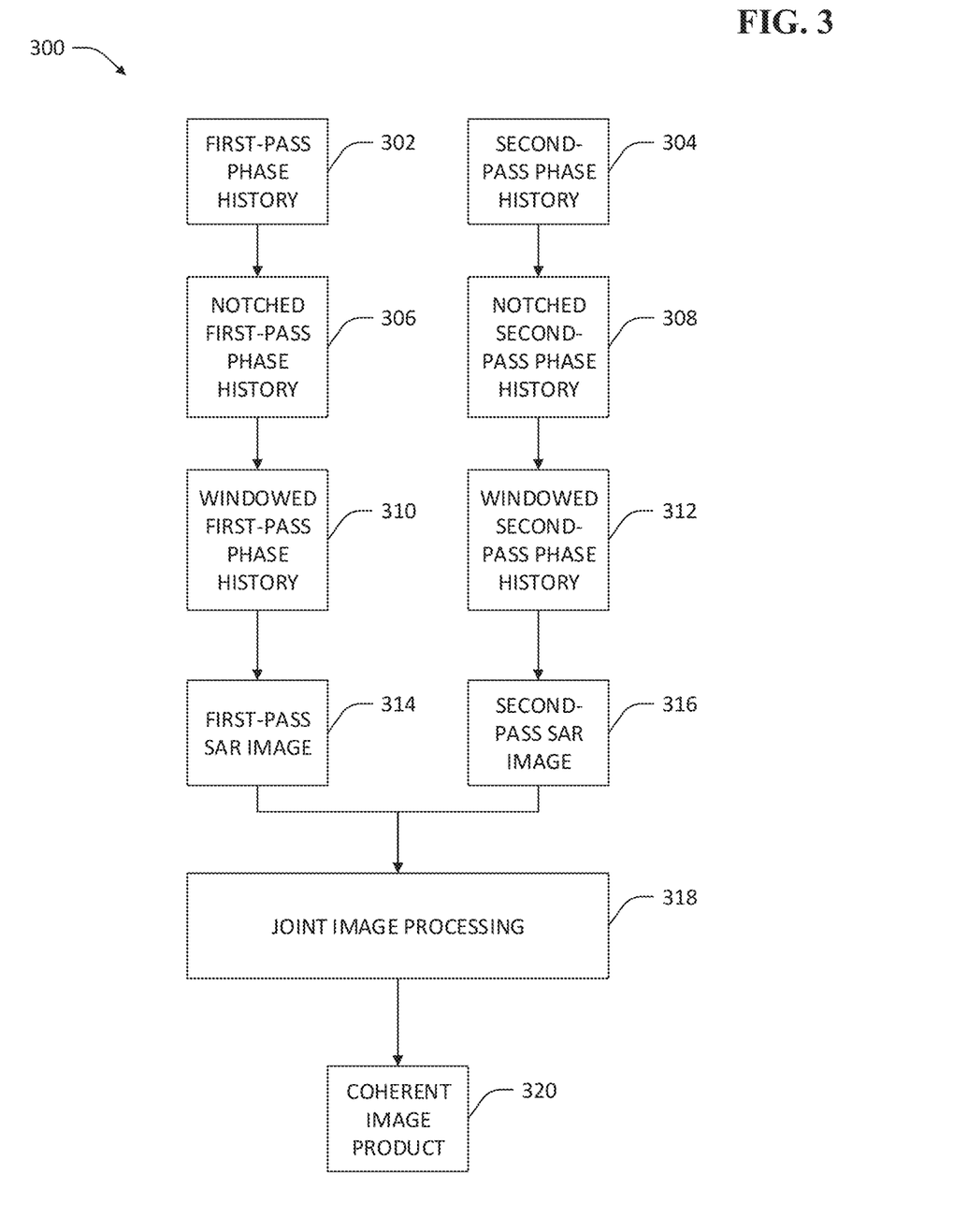
FIG. 3 is an exemplary data flow diagram.

Referring now to FIG. 3, an exemplary data flow diagram 300 that illustrates a state of first- and second-pass data through a plurality of processing steps performed by the computing system 108 for image artifact mitigation is shown. The diagram 300 begins with a first-pass phase history 302 and a second-pass phase history 304. The first-pass phase history 302 comprises phase data generated based upon an echo return of the SAR antenna 104 during a first pass of the SAR platform 102 traversing an area of interest (i.e., an area desirably scanned by the SAR antenna 104 in connection with generating SAR images of the area) at a first time. The second-pass phase history 304 similarly comprises phase data generated based upon an echo return of the SAR antenna 104 during a second pass of the SAR platform 102 traversing the area of interest at a second time. Since the echo returns of the SAR antenna 104 can include signal components resulting from sources of EM interference in the area of interest, the phase histories 302-304 can include data corresponding to EM interference. Accordingly, the phase histories 302-304 can be notch-filtered to remove data samples identified as corresponding to EM interference, yielding a notched first-pass phase history 306 and a notched second-pass phase history 308. In one example, the phase history 302 can be notch-filtered to remove data corresponding to interference, and the phase history 304 can be notch-filtered to match the notch filter applied to the phase history 302, in order to improve coherence between images generated from the phase histories 302-304. In another example, each of the phase histories 302-304 can be notch-filtered independently.

Data in each of the notched phase histories 306-308 can be windowed to generate a windowed first-pass phase history 310 and a windowed second-pass phase history-312. The windowed phase histories 310-312 can be generated by applying separate window functions to separate portions of each of the notched phase histories 306-308. For example, separate window functions can be applied to data on either side of notched data in either of the first-pass notched phase history 306 or the second-pass notched phase history 308. In a further example, a first window function can be applied to a first subset of data in the first-pass notched phase history 306, and the same first window function can be applied to a second subset of data in the second-pass notched phase history 308 in order to improve a coherence between images generated therefrom. After the windowed phase histories 310-312 are generated, a first-pass SAR image 314 is formed based upon the windowed first-pass phase history 310 and a second-pass SAR image 316 is formed based upon the windowed second-pass phase history 312. The SAR images 314-316 undergo joint image processing 318 to generate a coherent image product 320, such as a CCD image or IFSAR image.

Figure 4:
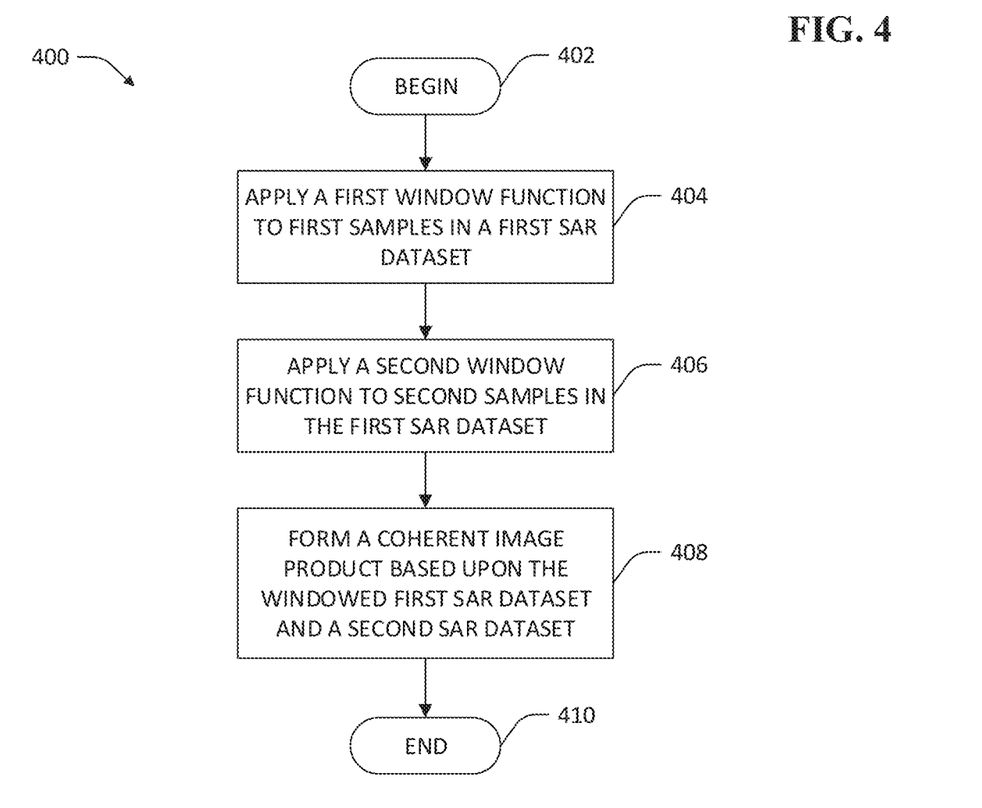
FIG. 4 is a flow diagram that illustrates an exemplary methodology for mitigating distortion in SAR-based coherent image products.
Figure 5:
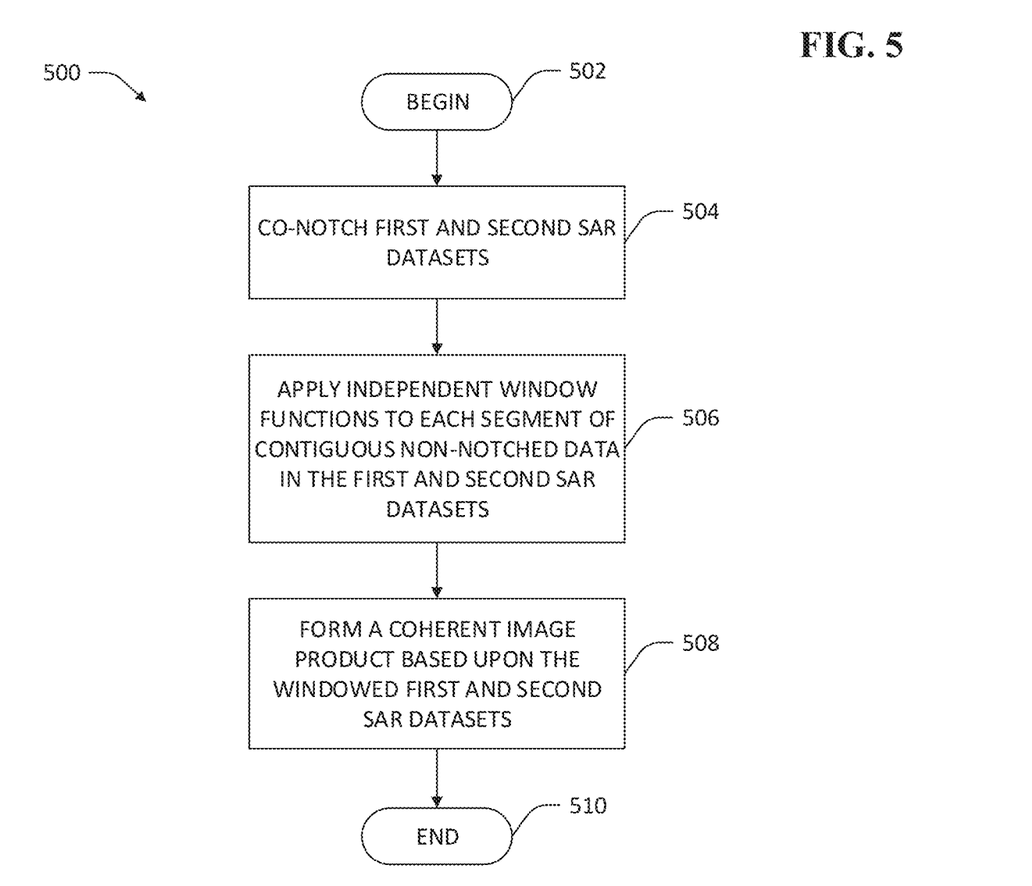
FIG. 5 is a flow diagram that illustrates an exemplary methodology for mitigating distortion in coherent image products derived from notch-filtered SAR data.
Figure 6:
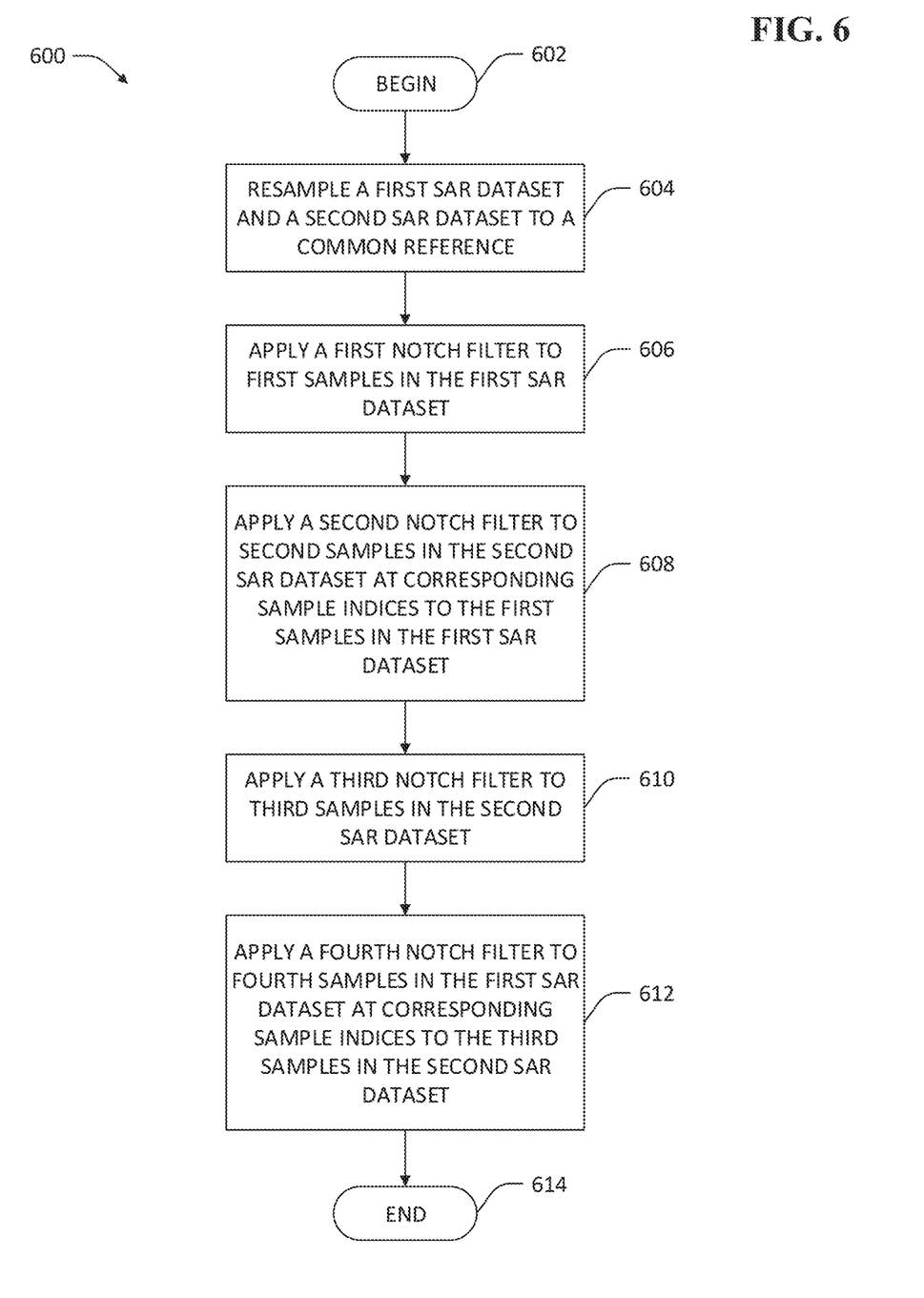
FIG. 6 is a flow diagram that illustrates an exemplary methodology for co-notching SAR datasets.

FIGS. 4-6 illustrate exemplary methodologies relating to mitigating image artifacts in coherent image products generated based upon SAR data. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 4, a methodology 400 that facilitates mitigating distortion in coherent image products by independent windowing of subsets of underlying SAR datasets is illustrated. The methodology 400 begins at 402, and at 404 a first window function is applied to first samples in a first SAR dataset. In an example, the first SAR dataset can be or include a phase history corresponding to an echo return of a SAR antenna. In another example, the first SAR dataset can be or include a spectral characteristic (e.g., FFT) of the echo return of the SAR antenna. The first samples in the first SAR dataset are a subset of all samples in the first SAR dataset. By way of example, the first SAR dataset can be a time-series phase history having a plurality of values over a time period $t_1$ to $t_2$, and the first samples can be samples in the time-series phase history from the time $t_1$ to $t_x$ wherein $t_x$ is a time between $t_1$ and $t_2$. At 406, a second window function is applied to second samples in the first SAR dataset. Continuing the example, the second samples can be samples in the time-series phase history from the time $t_x$ to $t_2$. The first and second window functions are configured to reduce sidelobe levels of an image impulse response of an image formed based upon the first SAR dataset. At 408 a coherent image product is formed based upon the windowed first SAR dataset (i.e., the first SAR dataset after the first and second window functions are applied to the first and second samples, respectively). The coherent image product exhibits improved image quality over coherent image products generated based upon the non-windowed first SAR dataset and the second SAR dataset. The methodology 400 ends at 410.

Referring now to FIG. 5, a methodology 500 that facilitates further improvement to quality of coherent image products by co-notching SAR datasets prior to windowing is illustrated. The methodology 500 begins at 502 and at 504 first and second SAR datasets are co-notched. In the co-notching, zero-valued data samples are matched between the first and second SAR datasets such that after the co-notching, the first SAR dataset has zero-valued data at same sample indices as the second SAR dataset and vice versa. Co-notching of the first and second SAR datasets can improve a coherence between first and second SAR images based upon the first and second SAR datasets, respectively. The improved coherence between the first and second SAR images can improve the quality of coherent image products generated based upon the first and second SAR images. At 506, independent window functions are applied to each segment of contiguous non-notched (i.e., non-zero-valued) data in the first SAR dataset, and the same independent window functions are applied to the second SAR dataset at same sample indices as in the first SAR dataset. Each of the window functions is configured to reduce sidelobe levels of image impulse responses of images generated from the first and second SAR datasets, as compared to sidelobe levels of image impulse responses of images generated from the non-windowed first and second SAR datasets. The window functions are configured to reduce the sidelobe levels while placing no constraint on distortion of the mainlobe. In other words, window functions are selected for application to the first and second SAR datasets without regard to their effect on the mainlobe of the image impulse responses. Application of the window functions at 506 increases a signal-to-noise ratio of the first and second SAR datasets. At 508, a coherent image product is formed based upon the windowed first and second SAR datasets, wherein a quality of the coherent image product is improved as compared to quality of a coherent image product generated based upon the non-windowed first and second SAR datasets. At 510 the methodology 500 ends.

Referring now to FIG. 6, a methodology 600 that facilitates co-notching first and second SAR datasets is illustrated. The methodology begins at 602 and at 604 first and second SAR datasets are resampled to a common reference. At 606 a first notch filter is applied to first samples in the first SAR dataset to filter out interference signal components in the first SAR dataset, wherein the first samples correspond to first sample indices in the first SAR dataset. At 608 a second notch filter is applied to second samples in the second SAR dataset, wherein the second samples are samples at sample indices in the second SAR dataset that correspond to the first sample indices in the first SAR dataset. A third notch filter is applied to the third samples in the second SAR dataset at 610, wherein the third notch filter is configured to filter interference signal components in the second SAR dataset. At 612 a fourth notch filter is applied to fourth samples in the first SAR dataset at sample indices in the first SAR dataset that correspond to sample indices of the third samples in the second SAR dataset, whereupon the methodology ends at 614. Thus, the methodology 600 facilitates filtering interference signal contributions from each of the first and second SAR datasets, and matching filtered data between the first and second SAR datasets such that each of the first and second SAR datasets is notched (i.e., set to zero) at same corresponding sample indices.

Figure 7:
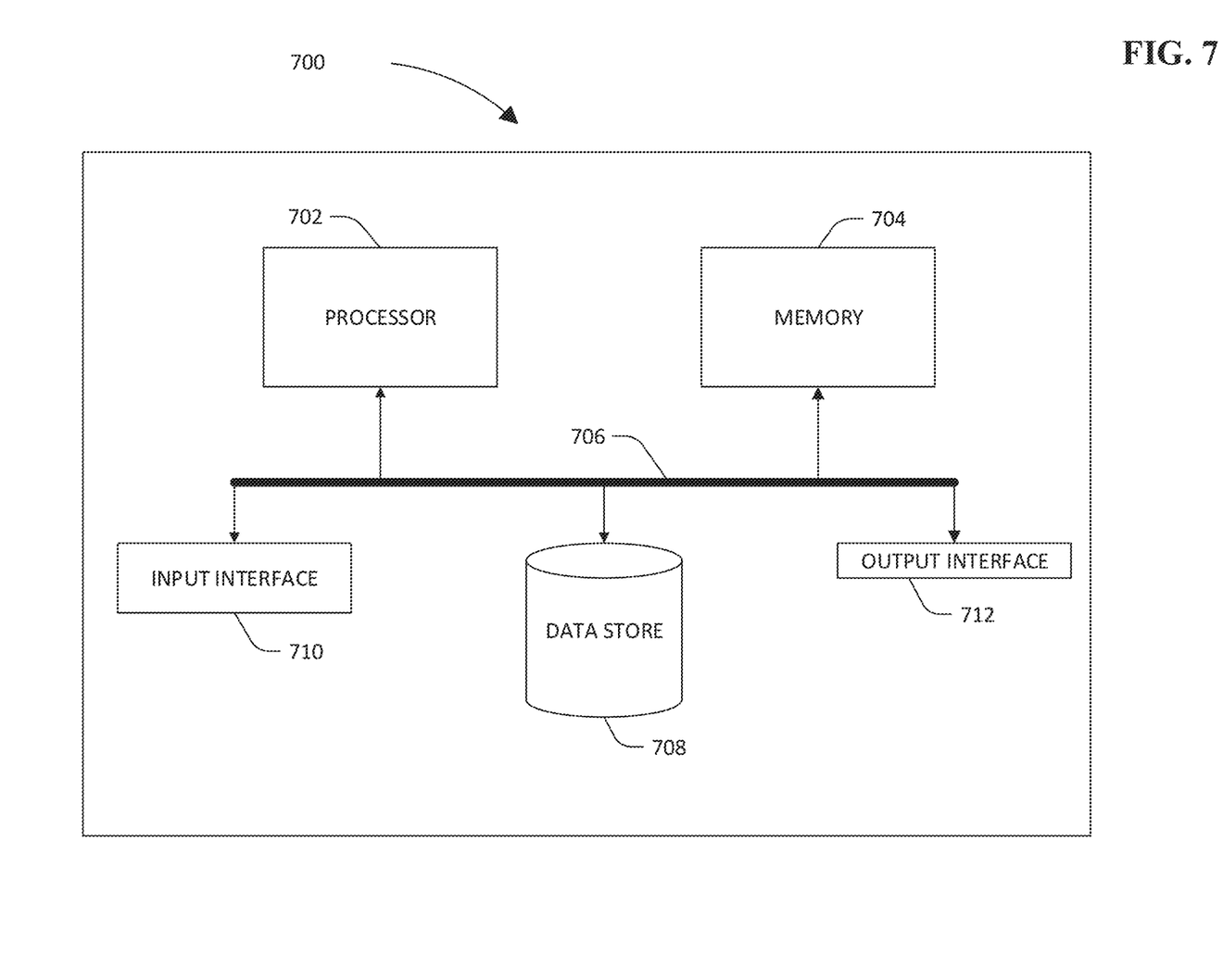
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in a system that receives and processes SAR data, and generates SAR images and coherent image products based upon the SAR data. By way of another example, the computing device 700 can be used in a system that facilitates presentment of SAR data and images to a user. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store SAR datasets such as phase histories and spectral characteristics, SAR images, coherent image products, etc.

The computing device 700 additionally includes a data store 708 that is accessible by the processor 702 by way of the system bus 706. The data store 708 may include executable instructions, SAR datasets, SAR images, coherent image products, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASIC s), Program-specific Standard Products (AS SPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   at least one processor; and
   memory comprising instructions that, when executed by the at least one processor, cause the at least one processor to perform acts comprising:
      generating a first windowed synthetic aperture radar (SAR) dataset based upon:
         applying a first window function to a first set of samples in a first SAR dataset, the first SAR dataset corresponding to a SAR scan of a scene at a first time;
         applying a second window function to a second set of samples in the first SAR dataset; and
      generating a coherent image product based upon the first windowed SAR dataset and a second SAR dataset that corresponds to a SAR scan of the scene at a second time, wherein the first windowed SAR dataset and the second SAR dataset are co-notched such that the first windowed SAR dataset has zero-valued samples at locations corresponding to zero-valued samples in the second SAR dataset.

2. The system of claim 1, wherein the coherent image product is a coherent change detection image.

3. The system of claim 1, wherein the coherent image product is an interferometric SAR image.

4. The system of claim 1, the acts further comprising:
   generating the second SAR dataset based upon:
      applying a third window function to a third set of samples in a third SAR dataset; and
      applying a fourth window function a fourth set of samples in the third SAR dataset.

5. The system of claim 1, wherein generating the first windowed SAR dataset further comprises notch-filtering a third set of samples in the first SAR dataset, wherein the third set of samples is non-overlapping with the first and second sets of samples.

6. The system of claim 5, wherein the first and second sets of samples are non-overlapping and non-adjacent.

7. The system of claim 5, wherein the third set of samples are located in the first SAR dataset at locations corresponding to locations of zero-valued samples in the second SAR dataset.

8. The system of claim 1, wherein the first window function is applied to a same number of samples as the first set of samples and the second window function is applied to a same number of samples as the second set of samples.

9. A method, comprising:
   generating windowed synthetic aperture radar (SAR) data based upon:
      applying a first window function to a first set of samples in a first SAR dataset, the first SAR dataset corresponding to a first SAR scan of a scene; and
      applying a second window function to a second set of samples in the first SAR dataset; and
   generating a coherent image product based upon the windowed SAR data and a second SAR dataset, the second SAR dataset corresponding to a second SAR scan of the scene, the windowed SAR data and the second SAR dataset being co-notched such that the first windowed SAR dataset has zero-valued samples at locations corresponding to zero-valued samples in the second SAR dataset.

10. The method of claim 9, wherein the first window function and the second window function are Taylor window functions.

11. The method of claim 9, wherein the coherent image product is a coherent change detection image.

12. The method of claim 9, wherein at least a portion of the first SAR dataset comprises notch-filtered samples, and wherein the first set of samples and the second set of samples do not include the notch-filtered samples.

13. The method of claim 9, further comprising:
prior to generating the windowed SAR data, co-notching the first SAR dataset and the second SAR dataset such that the first SAR dataset and the second SAR dataset have zero-valued samples in same locations.

14. The method of claim 9, further comprising:
generating the second SAR dataset based upon:
applying a third window function to a third set of samples in a third SAR dataset, the third SAR dataset corresponding to the second SAR scan of the scene; and
applying a fourth window function to a fourth set of samples in the third SAR dataset.

15. The method of claim 14, wherein the first window function and the third window function are a same function.

16. The method of claim 9, wherein the first set of samples and the second set of samples are non-adjacent and non-overlapping.

17. The method of claim 9, wherein the first window function is applied to a same number of samples as the first set of samples and the second window function is applied to a same number of samples as the second set of samples.

18. A non-transitory computer-readable storage medium comprising instructions that, when executed by a processor, perform the following acts:
responsive to receiving first and second SAR datasets corresponding to SAR scans of a scene at first and second respective times, co-notching the first and second SAR datasets;
generating windowed SAR data based upon:
applying a first window function to a first set of samples in the first SAR dataset, the first window function matched to a size of the first set of samples; and
applying a second window function to a second set of samples in the first SAR dataset, the second window function matched to a size of the second set of samples; and
generating a coherent image product based upon the windowed SAR data and the second SAR dataset.

19. The non-transitory computer-readable storage medium of claim 18, wherein generating the coherent image product based upon the windowed SAR data and the second SAR dataset comprises:
generating second windowed SAR data based upon:
applying a third window function to a third set of samples in the second SAR dataset, the third window function matched to a size of the third set of samples; and
applying a fourth window function to a fourth set of samples in the second SAR dataset, the fourth window function matched to a size of the fourth set of samples; and
generating the coherent image product based upon the windowed SAR data and the second windowed SAR data.

* * * * *